United States Patent
Zhang et al.

(10) Patent No.: US 9,743,430 B2
(45) Date of Patent: Aug. 22, 2017

(54) METHODS, APPARATUS, USER EQUIPMENT, WIRELESS NETWORK NODE, AND COMPUTER PROGRAM PRODUCT FOR RANDOM ACCESS

(71) Applicant: Telefonaktiebolaget L M Ericsson (publ), Stockholm (SE)

(72) Inventors: Zhang Zhang, Beijing (CN); Edgar Ramos, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 93 days.

(21) Appl. No.: 14/760,339

(22) PCT Filed: Jan. 11, 2013

(86) PCT No.: PCT/CN2013/070375
§ 371 (c)(1),
(2) Date: Jul. 10, 2015

(87) PCT Pub. No.: WO2014/107884
PCT Pub. Date: Jul. 17, 2014

(65) Prior Publication Data
US 2015/0351133 A1    Dec. 3, 2015

(51) Int. Cl.
*H04L 12/28* (2006.01)
*H04W 74/08* (2009.01)
(Continued)

(52) U.S. Cl.
CPC ..... *H04W 74/0833* (2013.01); *H04W 52/243* (2013.01); *H04W 72/0446* (2013.01); *H04W 88/02* (2013.01); *H04W 88/08* (2013.01)

(58) Field of Classification Search
CPC ......... H04W 74/0833; H04W 72/0446; H04W 52/243; H04W 88/08; H04W 88/02
See application file for complete search history.

(56) References Cited

U.S. PATENT DOCUMENTS 7,881,722 B2 * 2/2011 Gunnarsson ...... H04W 72/0486
455/435.2
8,320,266 B2 * 11/2012 Wang
Helmersson ........ H04W 52/343
370/252

(Continued)

FOREIGN PATENT DOCUMENTS

CN          101170385 A      4/2008
WO       2006110453 A1     10/2006
(Continued)

OTHER PUBLICATIONS

3GPP, "3rd Generation Partnership Project; Technical Specification Group Radio Access Network; Enhanced uplink; Overall description; Stage 2 (Release 11)", 3GPP TS 25.319 V11.4.0, Jun. 2012, 1-85.

(Continued)

*Primary Examiner* — Robert Wilson
(74) *Attorney, Agent, or Firm* — Murphy, Bilak & Homiller, PLLC

(57) ABSTRACT

Embodiments of the disclosure provide a method, an apparatus, a wireless network node, a user equipment and a computer program product for random access in a wireless network. According to the method, a RoT level may be selected from a plurality of RoT levels according to a predetermined policy, and a time period with the selected RoT level may be determined for initiating a random access request.

19 Claims, 12 Drawing Sheets

(51) Int. Cl.
  *H04W 72/04* (2009.01)
  *H04W 52/24* (2009.01)
  *H04W 88/02* (2009.01)
  *H04W 88/08* (2009.01)

(56) References Cited

U.S. PATENT DOCUMENTS

| | | | |
|---|---|---|---|
| 8,897,210 B2* | 11/2014 | Love | H04W 56/0045 370/328 |
| 8,982,802 B2* | 3/2015 | Sampath | H04W 72/1236 370/329 |
| 9,307,497 B2* | 4/2016 | Blomgren | H04W 52/365 |
| 2004/0258035 A1 | 12/2004 | Fan et al. | |
| 2009/0046632 A1* | 2/2009 | Nanda | H04W 48/02 370/328 |
| 2009/0175248 A1* | 7/2009 | Kim | H04W 74/002 370/336 |
| 2010/0159970 A1* | 6/2010 | Hagerman | H04W 74/0866 455/500 |
| 2010/0272091 A1* | 10/2010 | Fabien | H04W 48/08 370/345 |
| 2011/0075636 A1* | 3/2011 | Blomgren | H04L 1/1822 370/336 |
| 2013/0102302 A1* | 4/2013 | Betrencourt | H04W 52/146 455/422.1 |

FOREIGN PATENT DOCUMENTS

| | | |
|---|---|---|
| WO | 2008121053 A1 | 10/2008 |
| WO | 2012169942 A1 | 12/2012 |

OTHER PUBLICATIONS

3GPP, "3rd Generation Partnership Project; Technical Specification Group Radio Access Network; Medium Access Control (MAC) protocol specification (Release 11)", 3GPP TS 25.321 V11.0.0, Dec. 2011, 1-198.

Hou, Jilei et al., "Implementing Interference Cancellation to Increase the EV-DO Rev A Reverse Link Capacity", IEEE Communications Magazine, Evolving Technologies for 3G Cellular Wireless Communications Systems, Feb. 2006, 96-102.

Wang, Xiaodong et al., "Iterative (Turbo) Soft Interference Cancellation and Decoding for Coded CDMA", IEEE Transactions on Communications, vol. 47, No. 7, Jul. 1999, 1046-1061.

\* cited by examiner

METHODS, APPARATUS, USER EQUIPMENT, WIRELESS NETWORK NODE, AND COMPUTER PROGRAM PRODUCT FOR RANDOM ACCESS

TECHNICAL FIELD

Embodiments of the present invention generally relate to wireless communication techniques. More particularly, embodiments of the present invention relate to a method, an apparatus, a user equipment (UE), a wireless network node and a computer program product for random access.

BACKGROUND

Random access is a fundamental procedure for a UE, sometimes referred to as a mobile radio terminal, to have access to a wireless network. The UE may perform a random access procedure upon occurrences of the following exemplary situations: when the UE performs an initial connection with the radio network node (e.g., a base station (BS)) if there is no connection (e.g., a radio resource control (RRC) connection); when the UE first accesses a target cell in a handover procedure; when requested by a command from the BS; and a recovery procedure when there is a radio link failure or handover failure.

A UE in an idle state monitors system information broadcasted by BSs within range to inform itself about "candidate" base stations in the service area. When a UE needs access to services from a radio access network, it sends a request over a random access channel (RACH) via a suitable BS, typically a base station with the most favorable radio conditions. Because the uplink propagation conditions are usually only approximately known, the UE gradually increases its transmission power over the RACH until either the BS acknowledges the RACH preamble or a predetermined number of unsuccessful access attempts has been reached. But assuming the UE is admitted the access, a radio communications connection or link via the most suitable BS is initiated towards the UE if there are available radio resources. Uplink coverage by the BS is thus a necessity for successful random access.

In a wireless network, such as a Code Division Multiple Access (CDMA) network, uplink radio resources in coverage of a cell are limited by rise over thermal (RoT) that the cell can tolerate. The RoT is a total received power at the BS divided by the thermal noise in the cell, and the cell coverage is limited by a maximum RoT. A high RoT facilitates high uplink data rate but limits the uplink coverage, which makes it difficult or even impossible for UEs to successfully complete random access from some parts of the cell coverage area, since the RACH preamble may not be detected by a BS.

The maximum RoT, sometimes referred to as the target RoT, is either determined based on coverage requirements and/or uplink power control stability requirements. When only one UE is transmitting over an uplink connection in the cell, power control stability is minor issue because the uplink interference is likely to be dominated by the power generated by this UE. In this situation, a higher maximum RoT may be used to allow a higher signal-to-interference ratio (SINR), which enables higher uplink data rates. When multiple UEs transmit simultaneously, their SINRs will be adversely affected due to inter-UE interference. In this case, a relatively lower maximum RoT is more suitable. However, setting a lower maximum RoT can guarantee the uplink coverage, but the uplink data rate will be punished.

Accordingly, in uplink of a wireless system, there is a trade-off between the cell coverage and enabled peak transmission rates over a radio interface. This trade-off is further emphasized with enhanced uplink, which supports higher data rates than ordinary dedicated channels. An existing solution is proposed towards this problem where high RoT is allowed in some time periods during which high uplink data rate can be achieved, correspondingly uplink coverage can only be guaranteed in part of the cell serving area and random access may be failed outside of that area. In some other time periods a lower RoT is allowed during which missed random access request (preamble detection) due to insufficient SINR can be avoided over the whole cell serving area. Specifically, with respect to a low target RoT, the missed preamble detection due to out of coverage (insufficient SINR) will be decreased, but there may be more RACH access failure due to RACH access collision. On the other hand, with respect to a high target RoT, there may be some RACH access failure due to insufficient coverage. A failed RACH access due to insufficient coverage will very likely fail again if it is still carried in a time period with insufficient coverage, which both consumes additional uplink load and increases RACH access delay.

In view of the foregoing problems, it would be desirable to obtain a better trade-off between cell coverage and uplink data rate for improving random access performance in the wireless network.

SUMMARY

To address or mitigate at least one of the above potential problems, embodiments of the present invention would provide for improving random access performance in the wireless network. Specifically, embodiments of the present invention provide solutions for determining a time period with a selected RoT level for initiating random access request, which effectively improve whole performance and throughput of the wireless network.

According to a first aspect of the present invention, embodiments of the invention provide a method for random access in a wireless network. According to the method, a RoT level may be selected from a plurality of RoT levels according to a predetermined policy, and a time period with the selected RoT level may be determined for initiating a random access request.

According to a second aspect of the present invention, embodiments of the invention provide an apparatus for random access in a wireless network. The apparatus may comprise a selector and a first determiner. The selector may be configured to select a RoT level from a plurality of RoT levels according to a predetermined policy. The first determiner may be configured to determine a time period with the selected RoT level for initiating a random access request.

According to a third aspect of the present invention, embodiments of the invention provide a wireless network node comprising an apparatus according to embodiments of the present invention.

According to a fourth aspect of the present invention, embodiments of the invention provide a user equipment comprising an apparatus according to embodiments of the present invention.

According to a fifth aspect of the present invention, embodiments of the invention provide an apparatus for random access in a wireless network. The apparatus may comprise: at least one processor; and at least one memory including compute program instructions, wherein the at least one memory and computer program instructions are configured to, with the at least one processor, cause the apparatus at least to perform methods according to embodiments of the present invention.

According to a sixth aspect of the present invention, embodiments of the invention provide a computer program product. The computer program product may comprises at least one computer readable storage medium having a computer readable program code portion stored thereon, and the computer readable program code portion may comprise program code instructions for performing methods according to embodiments of the present invention.

Compared with those existing solutions, the proposed solution determines respective proper time periods with proper RoT levels for different UEs in the wireless network to transmit random access requests, such that a better trade-off between cell coverage and uplink data rate is obtained and random access performance in the wireless network is improved.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

The embodiments of the present invention that are presented in the sense of examples and their advantages are explained in greater detail below with reference to the accompanying drawings, in which.

Throughout the figures, same or similar reference numbers indicate same or similar elements.

DETAILED DESCRIPTION

Figure 1:
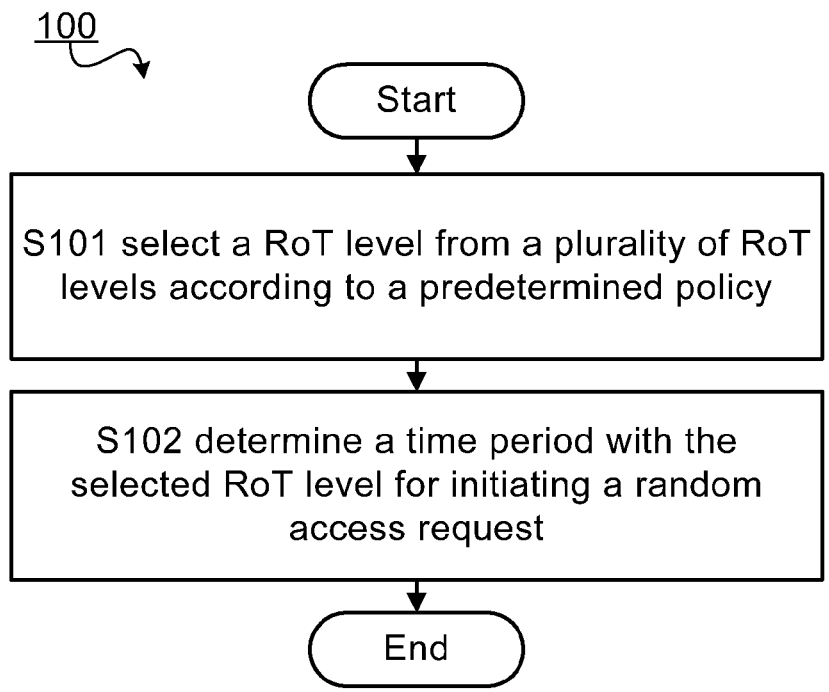
FIG. 1 illustrates a flow chart of a method 100 for random access in a wireless network according to embodiments of the invention.

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention may be applied in various wireless networks, including but not limited to the Code Division Multiple Access (CDMA) network. Given the rapid development in communications, there will of course also be future type wireless communication technologies and systems with which the present invention may be embodied. It should not be seen as limiting the scope of the invention to only the aforementioned system.

As further discussed below, embodiments in this disclosure separate user data transmissions in time by using a time division multiplex (TDM) scheme, so that shared uplink radio resources are granted by taking into account different levels of RoT or uplink load in the cell. As such, different time periods for uplink transmission may have different RoT levels. The RoT level prescribes the target RoT value in a time period. Random access performance improves during low RoT levels or low uplink load and deteriorates for high RoT levels or high uplink load.

Embodiments of the present invention provide a method and apparatus for random access in a wireless network. According to embodiments of the present invention, a suitable RoT level may be selected according to a predetermined policy, and a time period having the suitable RoT level may be determined, such that a UE initiates a random access request in the determined time period. In this way, all UEs in one cell will no longer initiate a random access request at the same RoT level. In other words, different UEs may initiate random access requests in time periods with different RoT levels, respectively. Accordingly, a good balance between preamble misdetection and random access collision can be achieved, and the benefit of coverage time periods, i.e. time periods with low target RoT, can be sufficiently exploited. Now some exemplary embodiments of the present invention will be described below with reference to the figures.

Reference is first made to FIG. 1, which illustrates a flow chart of a method 100 for random access in a wireless network according to embodiments of the invention. In accordance with embodiments of the present invention, method 100 may be carried out by a wireless network node, a UE, or any other applicable device.

In the disclosure, a wireless network node may refer to, for example, a base station (BS), a base station controller (BSC), a radio network controller (RNC), a gateway, a relay, a server, and so on. The wireless network node may include some or all of the functions of the BS, the BSC, the RNC, the gateway, the relay, or the server.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and so on. The UE may include some or all of the functions of the UE, the terminal, the MT, the SS, the PSS, the MS, or the AT.

After method 100 starts, at step S101, a RoT level is selected from a plurality of RoT levels according to a predetermined policy.

In accordance with embodiments of the present invention, there may be multiple predetermined policies for selecting a RoT level. For better understanding, the following embodiments of the present disclosure are described with respect to predetermined policies relating to, such as, random access request load, signal quality, and/or historical access request information. According to embodiments of the present invention, a RoT level may be selected from the plurality of RoT levels according to at least one of: random access request load, signal quality, and historical access request information.

It is to be noted that, the predetermined policy according to embodiments of the present invention may take other suitable factors and/or any combination of them into account. As can be appreciated by those skilled in the art, the random access request load, the signal quality, and/or the historical access request information employed in selection of a RoT level from the plurality of RoT levels are illustrated in the present disclosure for purpose of example, rather than limitation.

According to some exemplary embodiments of the present invention, random access request load in at least one time period may be determined and a RoT level may be selected from a plurality of RoT levels based on the random access request load. Further details may be found in descriptions in connection to embodiments illustrated with FIG. 2 and FIG. 3.

According to further exemplary embodiments of the present invention, signal quality of a channel between a Wireless Network Node and a UE is obtained and a RoT level from the plurality of RoT levels may be selected based on the signal quality. Further details may be found in descriptions in connection to embodiments illustrated with FIG. 4 and FIG. 5.

According to still further exemplary embodiments of the present invention, historical access request information may be obtained in the wireless network and a RoT level may be selected from the plurality of RoT levels based on the historical access request information. Further details may be found in descriptions in connection to embodiments illustrated with FIG. 6, FIG. 7 and FIG. 8.

At step S102, a time period with the selected RoT level is determined for initiating a random access request.

According to some exemplary embodiments of the present invention, RoT levels of a plurality of time periods may be first obtained, and at least one time period with the selected RoT level may be determined according to the RoT levels of the plurality of time periods. Further details may be found in descriptions in connection to embodiments illustrated with FIG. 9.

In the disclosure, a time period is a period of time for uplink transmission. In the wireless network according to embodiments of the invention, a data block is sent in uplink by a UE to a BS during a time period, which is sometimes referred to a transmission time interval (TTI), which usually corresponds to one Hybrid Automatic Repeat Request (HARQ) process. Some exemplary embodiments will be described below with reference to TTI. It is to be noted that the TTI is an example of the time period according to the embodiments of the present invention, rather than limitation.

In accordance with other embodiments, the method for random access according to the present invention may optionally comprise step(s) of reinitiating the random access request, determining proper time period(s) for random access message transmission, and so on. Further details may be found in descriptions in connection to embodiments illustrated with FIG. 10.

With respect to embodiments illustrated by FIG. 1, it is advantageous that, different from the existing solutions, a predetermined policy is employed to select a suitable RoT level, such that a UE may initiate a random access request in a time period with the selected RoT level. It is also advantageous that, a good balance between preamble misdetection and random access collision can be achieved, and the benefit of time periods with low target RoT can be sufficiently exploited.

Figure 2:
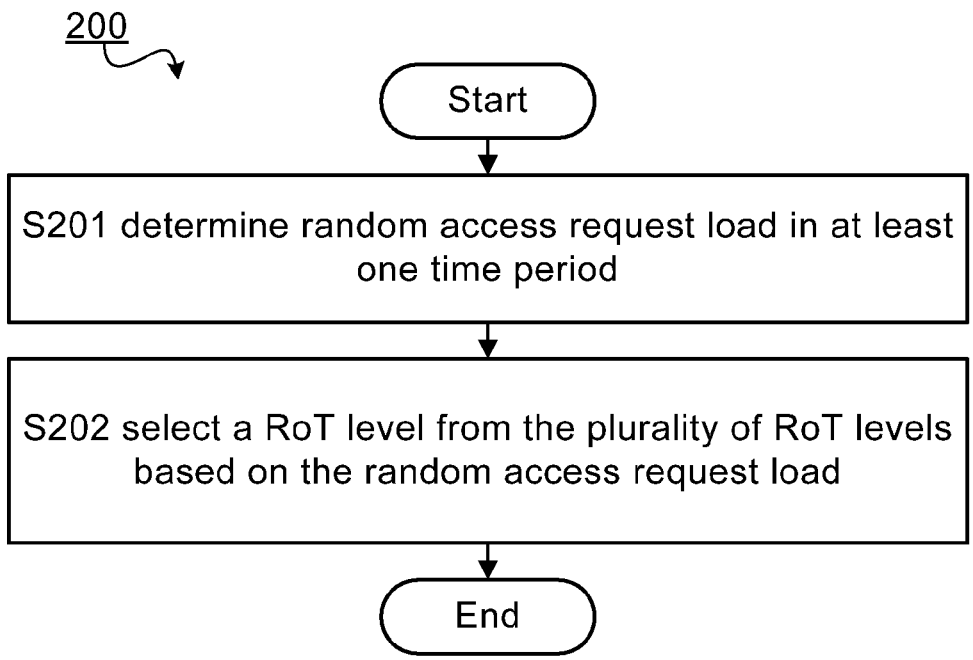
FIG. 2 illustrates a flow chart of a method 200 for selecting a RoT level from a plurality of RoT levels based on a predetermined policy according to embodiments of the invention.

Reference is now made to FIG. 2, which illustrates a flow chart of a method 200 for selecting a RoT level from a plurality of RoT levels based on a predetermined policy according to embodiments of the invention. Method 200 may be considered as an embodiment of step S101 of method 100 described above with reference to FIG. 1. In the following description of method 200, the predetermined policy relates to random access request load in at least one time period. As such, the RoT level may be selected from the plurality of RoT levels based on random access request load. However, it is noted that this is only for the purpose of illustrating the principles of the present invention, rather than limiting the scope thereof.

After method 200 starts, at step S201, random access request load in at least one time period is determined.

In some embodiments, the random access request load may be determined over one time period, e.g., one TTI. In some other embodiments where there are 8 TTIs or Hybrid Automatic Repeat Request (HARQ) processes, the random access request load may be obtained, for example, over multiple TTIs (HARQ process) with low RoT levels. In this case, the mean load over the multiple TTIs may be determined as the random access request load.

According to embodiments of the present invention, the random access request load can be measured in terms of the ratio of collided random access (e.g, RACH access) request number to the total random access request number. The total number comprises the collided number plus successful number of the random access requests. Whether a random access request is collided or successful may be determined by preamble detection.

In accordance with embodiments of the present invention, the random access request load in at least one time period may be determined by obtaining a number of collided random access requests and a total number of all random access requests in the at least one time period, and determining random access request load based on the obtained two numbers. Discussion in connection with steps S301-S303 of FIG. 3 will provide further details.

At step S202, a RoT level is selected from the plurality of RoT levels based on the random access request load.

In accordance with embodiments of the present invention, based on the random access request load determined at step S201, a RoT level may be selected from a plurality of RoT levels according to the determined random access request load level, wherein the random access request load level is determined for the random access request load according to different random access request load levels. Discussion in connection with steps S304-S306 of FIG. 3 will provide further details.

With respect to embodiments illustrated by FIG. 2, it is advantageous that, the RoT level is selected based on the random access request load, which effectively reduces unnecessary collision of random access requests in the wireless network. As such, a controlled balance between random access channel (RACH) midsection due to too low SINR and that due to collision is obtained.

Figure 3:
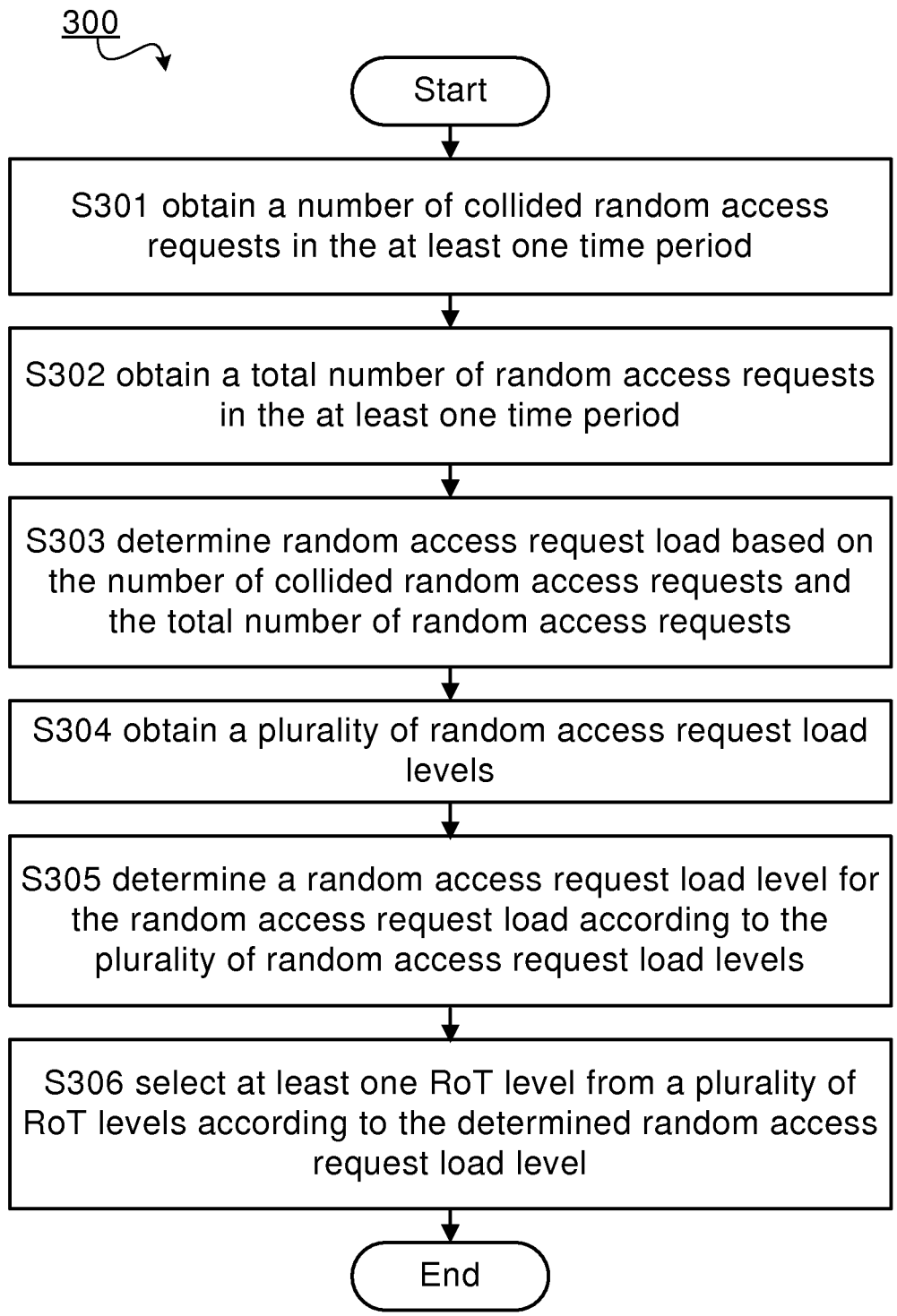
FIG. 3 illustrates a flow chart of a method 300 for selecting a RoT level from a plurality of RoT levels based on random access request load according to embodiments of the invention.

Reference is now made to FIG. 3, which illustrates a flow chart of a method 300 for selecting a RoT level from a plurality of RoT levels based on random access request load according to embodiments of the invention. Method 300 may be considered as an embodiment of step S101 of method 100 described above with reference to FIG. 1. Method 300 may be also considered as an embodiment of method 200 described above with reference to FIG. 2. However, it is noted that this is only for the purpose of illustrating the principles of the present invention, rather than limiting the scope thereof.

After method 300 starts, at step S301, a number of collided random access requests in the at least one time period is obtained. At step S302, a total number of random access requests in the at least one time period is obtained.

As discussed above, in some embodiments, the random access request load may be determined over one TTI, so a wireless network node (e.g., BS) or a UE may obtain the number of collided random access requests and the total number of all random access requests in this TTI. In some other embodiments, the random access request load may be determined over multiple TTIs. In this case, the BS or the UE may obtain collided request number in each of the multiple TTIs and calculate the sum of the collided request numbers as the number of collided random access requests; meanwhile, the BS or the UE may obtain the total request number in each of the multiple TTIs and calculate the sum of the total request numbers as the total number of random access requests.

At step S303, random access request load is determined based on the number of collided random access requests and the total number of random access requests.

The random access request load may be determined in several ways. In some embodiments, the random access request load may be determined in terms of the ratio of the number of collided random access requests to the total number of random access requests.

As an alternative, when multiple TTIs are employed to determine the random access request load, the ratio of collided random access request number to total random access request number may be obtained with respect to each of the multiple TTIs, and a mean value of the obtained ratios may be calculated as the random access request load.

According to embodiments of the present invention, optionally, the random access request load may be weighted by a predetermined weight, such that it may be adjusted by the operator, the vendor, and so on.

At step S304, a plurality of random access request load levels are obtained.

The random access request load levels (also referred to "load level") may be preset or predefined. For example, three levels may be predefined. The first level corresponds to a high load level, the second level corresponds to a medium load level, and the third level corresponds to a low load level. Accordingly, a low random access request load may be classified to a low load level, a medium random access request load may be classified to a medium load level, and a high random access request load may be classified to a high load level.

At step S305, a random access request load level for the random access request load is determined according to the plurality of random access request load levels.

According to embodiments of the present invention, the random access request load may be regarded as being low if its value (i.e., the ratio determined at step S303) is lower than a first load threshold, denoted as loadthreshold$_{low}$. The random access request load may be regarded as being medium if its value is higher than loadthreshold$_{low}$ but lower than a second load threshold, denoted as loadthreshold$_{high}$. Further, the random access request load may be regarded as being high if this ratio is higher than loadthreshold$_{high}$. In view of the plurality of random access request load levels obtained at step S305, the low random access request load may be denoted with a low load level, the medium random access request load may be denoted with a medium load level, and the high random access request load may be denoted with a high load level.

As can be appreciated by those skilled in the art, the first and second load thresholds, i.e., loadhreshold$_{low}$ and loadthreshold$_{high}$, are not limited to be fixed values, instead, both of them are configurable. According to embodiments of the present invention, such threshold may be predetermined in several ways. For example, the thresholds may be predetermined according to experience of an operator of the communication system or those skilled in the art; the thresholds may also be predetermined according to concrete communication conditions of the communication system; additionally, the thresholds may be predetermined based on historical information of the wireless network. It is to be noted that the above examples are described for illustration, and the threshold may be obtained in other ways besides the above examples.

At step S306, at least one RoT level is selected from a plurality of RoT levels according to the determined random access request load level.

In some embodiments of the present invention, suppose there are three kind of TTIs (HARQ process) with low, medium and high levels of RoT value for different uplink coverage area respectively, the RoT level(s) suitable for initiating a random access request may be determined based on the random access request load level determined at step S305. For example, a predetermined policy relating to the random access request load is as follows:

the low RoT level is suitable for random access requests in response to a low random access request load level;

both the low RoT level and the medium RoT level are suitable for random access requests in response to a medium random access request load level; and all the RoT levels (low, medium and high) are suitable for random access requests in response to a high random access request load level.

In other words, TTIs with the low RoT level may be allowed for random access requests at all random access request loads; TTIs with the medium RoT level may be allowed for random access requests at medium and high random access request loads; and TTIs with the high RoT level may be allowed for random access requests only at high random access request load.

According to embodiments of the present invention, the information on the plurality of RoT levels and/or association of TTIs with RoT levels (e.g., a flag of the RoT level associated with each TTI) may be informed to the UE by a wireless network node. As an alternative, the information may also be known in advance by the UE, e.g., pre-stored at the UE.

It is to be noted that, besides the three RoT levels illustrated above, some embodiments of the present invention may use two RoT levels or more than three RoT levels. The above embodiments are illustrated only for example, rather than limitation.

With respect to embodiments illustrated by FIG. 3, it is advantageous that, different from the existing solutions, one or more RoT levels may be selected from a plurality of RoT levels according to the random access request load level. In this way, the random access request may be initiated in time periods with a suitable RoT level, which effectively reduces unnecessary collision of random access requests in the wireless network.

Figure 4:
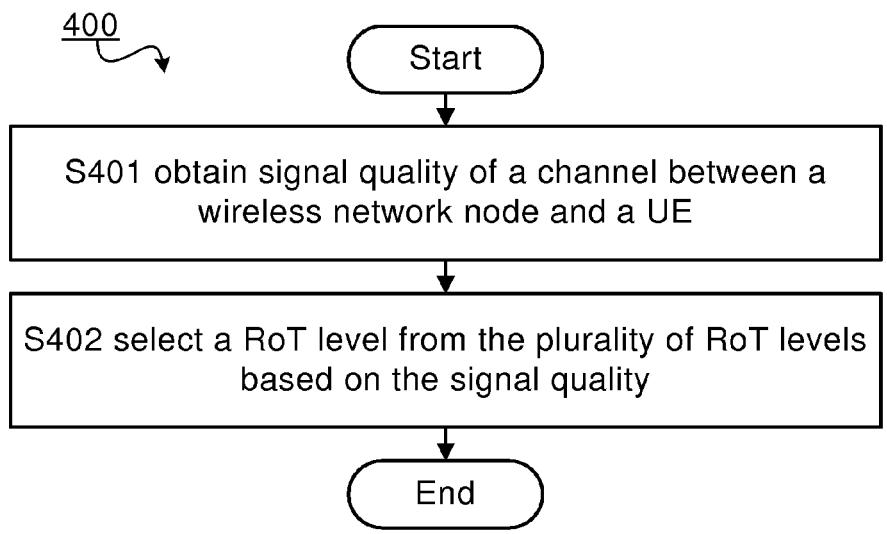
FIG. 4 illustrates a flow chart of a method 400 for selecting a RoT level from a plurality of RoT levels based on a predetermined policy according to embodiments of the invention.

Reference is now made to FIG. 4, which illustrates a flow chart of a method 400 for selecting a RoT level from a plurality of RoT levels based on a predetermined policy according to embodiments of the invention. Method 400 may be considered as an embodiment of step S101 of method 100 described above with reference to FIG. 1. In the following description of method 400, the predetermined policy relates to signal quality, e.g., signal quality of a channel between a UE and a wireless network node. As such, the RoT level may be selected from the plurality of RoT levels based on the signal quality. However, it is noted that this is only for the purpose of illustrating the principles of the present invention, rather than limiting the scope thereof.

After method 400 starts, at step S401, signal quality of a channel between a wireless network node and a UE is obtained.

According to embodiments of the present invention, the signal quality may comprise information which reflects the quality of the channel between a wireless network node (e.g., a BS) and a UE. For example, the signal quality may comprise signal to interference plus noise ratio (SINR), Signal to Noise Ratio (SNR), Signal to Interference Ratio (SIR), Carrier to Interference plus Noise Ratio (CINR), Carrier to Noise Ratio (CNR), and so on.

In the embodiments of the present invention, a higher target RoT level may be used to allow a higher SIR, Ec/Io, which enables higher uplink bit rates. Accordingly, the signal quality is exemplarily illustrated by the SIR. It is to be noted that, in other embodiments of the present invention, the signal quality may further comprise SNR, SIR, CINR, CNR or any combination of SINR, SNR, SIR, CINR, and CNR.

At step S402, a RoT level is selected from the plurality of RoT levels based on the signal quality.

In accordance with embodiments of the present invention, based on the signal quality obtained at step S401, the selection of a RoT level may be implemented in multiple ways. For example, the RoT level may be selected by: obtaining a plurality of quality levels; determining a quality level for the signal quality according to the plurality of quality levels; and selecting at least one RoT level from a plurality of RoT levels according to the determined quality level. Discussion in connection with steps S502-S504 of FIG. 5 will provide further details.

With respect to embodiments illustrated by FIG. 4, it is advantageous that, the RoT level is selected based on the signal quality of the channel, so that the UE may initiate the random access request in a TTI with such a RoT level. As such, a controlled balance between RACH midsection due to too low SINR and that due to collision is obtained.

Figure 5:
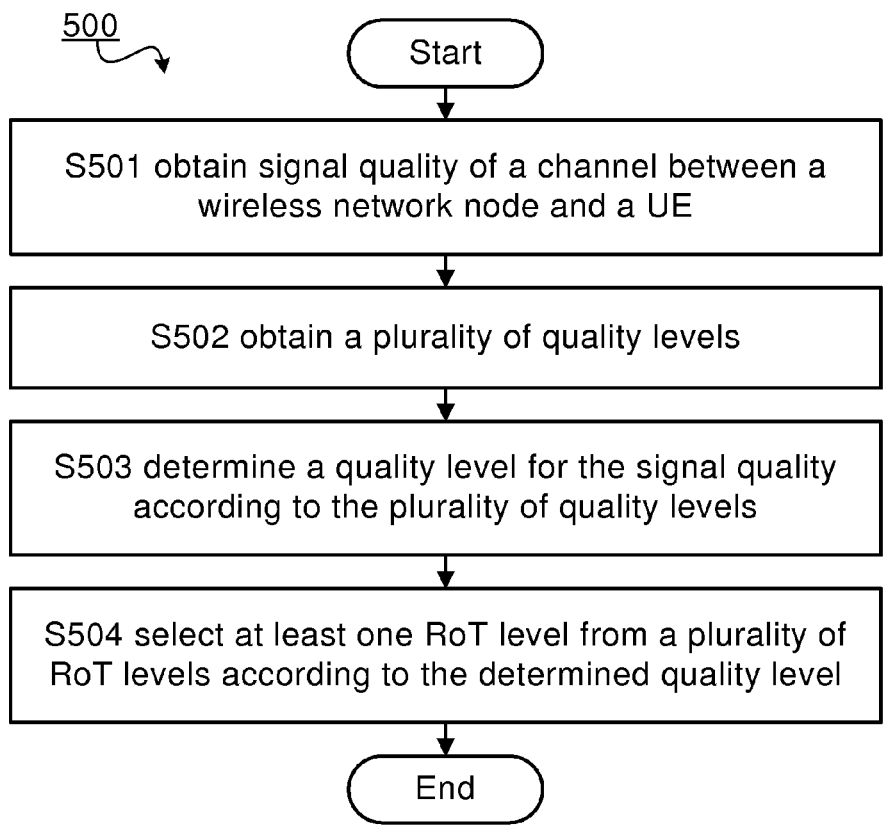
FIG. 5 illustrates a flow chart of a method 500 for selecting a RoT level from a plurality of RoT levels based on signal quality according to embodiments of the invention.

Reference is now made to FIG. 5, which illustrates a flow chart of a method 500 for selecting a RoT level from a plurality of RoT levels based on signal quality according to embodiments of the invention. Method 500 may be considered as an embodiment of step S101 of method 100 described above with reference to FIG. 1. Method 500 may be also considered as an embodiment of method 400 described above with reference to FIG. 4. However, it is noted that this is only for the purpose of illustrating the principles of the present invention, rather than limiting the scope thereof.

After method 500 starts, at step S501, signal quality of a channel between a wireless network node and a UE is obtained.

The signal quality may be obtained in several ways. For example, a UE may measure reference signals received from a wireless network node (such as a BS) to obtain the signal quality of the channel there between. For another example, the BS may instruct a UE to perform measurement on the reference signals and report the measurement, so the BS may obtain the signal quality of the channel between the BS and the UE.

At step S502, a plurality of quality levels are obtained.

The quality levels may be preset or predefined according to embodiments of the present invention. For example, three quality levels may be predefined. The first quality level corresponds to a high quality level, the second quality level corresponds to a medium quality level, and the third quality level corresponds to a low quality level. Accordingly, if the signal quality obtained at step S501 is low, it may be classified to a low quality level; if the signal quality obtained at step S501 is medium, it may be classified to a medium quality level; and if the signal quality obtained at step S501 is high, it may be classified to a high quality level.

At step S503, a quality level for the signal quality is determined according to the plurality of quality levels.

According to embodiments of the present invention, the signal quality may be regarded as being low if its value is lower than a first quality threshold, denoted as qualitythreshold$_{low}$. The signal quality may be regarded as being medium if its value is higher than qualitythreshold$_{low}$ but lower than another threshold, denoted as qualitythreshold$_{high}$. Further, the signal quality may be regarded as being high if this ratio is higher than qualitythreshold$_{high}$. In view of the plurality of quality levels obtained at step S502, the low signal quality may be assigned with a low quality level, the medium signal quality may be assigned with a medium quality level, and the high signal quality may be assigned with a high quality level.

As can be appreciated by those skilled in the art, the first and second quality thresholds, i.e., qualitythreshold$_{low}$ and qualitythreshold$_{high}$, are not limited to be constant; instead, both of them are configurable.

At step S504, at least one RoT level is selected from a plurality of RoT levels according to the determined quality level.

In some embodiments of the present invention, suppose there are three kind of TTIs with low, medium and high levels of RoT value for different uplink coverage area respectively, the RoT level(s) suitable for initiating a random access request may be determined based on the quality level determined at step S503. For example, a predetermined policy relating to the signal quality is as follows:
 the low RoT level is suitable for random access requests in response to a low quality level;
 both the low RoT level and the medium RoT level are suitable for random access requests in response to a medium quality level; and
 all the RoT levels (low, medium and high) are suitable for random access requests in response to a high quality level.

In other words, TTIs with the low RoT level may be allowed for random access requests when the signal quality is low, medium or high; TTIs with the medium RoT level may be allowed for random access requests when the signal quality is medium or high; and TTIs with the high RoT level may be allowed for random access requests only when the signal quality is high.

With respect to embodiments illustrated by FIG. 5, it is advantageous that, different from the existing solutions, one or more RoT levels may be selected from a plurality of RoT levels according to the signal quality. In this way, the random access request may be initiated in time periods with a suitable RoT level, which effectively reduces unnecessary collision of random access requests and achieves a good balance between preamble misdetection and random access collision.

Figure 6:
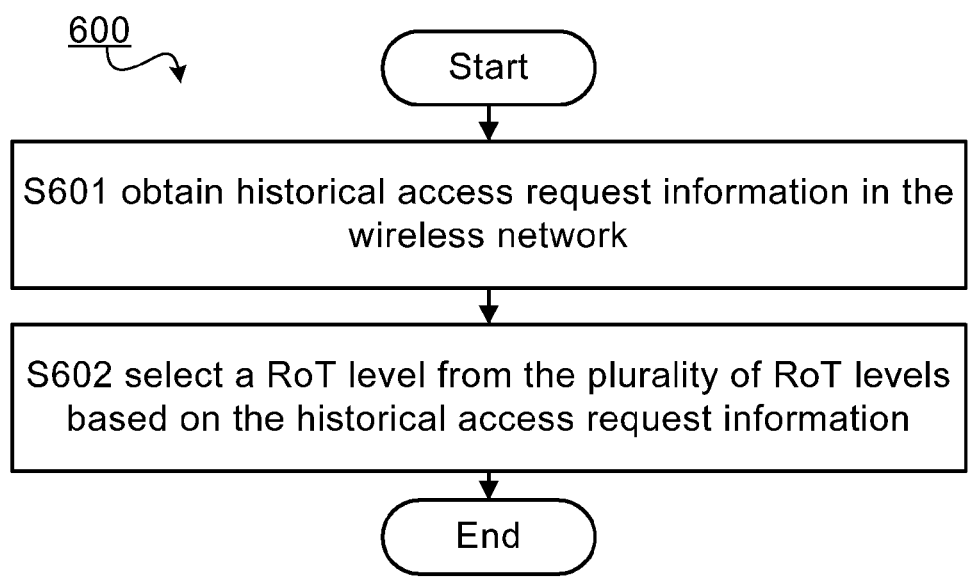
FIG. 6 illustrates a flow chart of a method 600 for selecting a RoT level from a plurality of RoT levels based on a predetermined policy according to embodiments of the invention.

Reference is now made to FIG. 6, which illustrates a flow chart of a method 600 for selecting a RoT level from a plurality of RoT levels based on a predetermined policy according to embodiments of the invention. Method 600 may be considered as an embodiment of step S101 of method 100 described above with reference to FIG. 1. In the following description of method 600, the predetermined policy relates to historical access request information. As such, the RoT level may be selected from the plurality of RoT levels based on the historical access request information. However, it is noted that this is only for the purpose of illustrating the principles of the present invention, rather than limiting the scope thereof.

After method 600 starts, at step S601, historical access request information in the wireless network is obtained.

The historical access request information may comprise information on access requests previous to the current instant. In some embodiments, the historical access request information may comprise access request information associated with one or more historical random access requests. For example, the access request information may comprise historical reference signal strength and/or UE's historical transmit power associated with one or more historical random access requests. The historical reference signal strength may indicate the strength of reference signals obtained during initiation of the associated historical random access request.

In some other embodiments, the historical access request information may further comprise a time period in which a historical random access request is initiated, a RoT level suitable for a historical random access request, and so on.

According to embodiments of the present invention, the historical access request information may be recorded in a device including, for example, semiconductor memory devices, e.g., RAM, ROM, EPROM, EEPROM, and flash memory. The device is accessible to the wireless network node and the UE, such that both of them may obtain the historical access request information via the device.

At step S602, a RoT level is selected from the plurality of RoT levels based on the historical access request information.

In accordance with embodiments of the present invention, the selection of the RoT level based on the historical access request information may be implemented in several ways.

According to some embodiments, the historical access request information comprises historical reference signal strength associated with a historical random access request, which indicates strength of reference signals obtained during initiation of the historical random access request. The RoT level may be selected by extracting the historical reference signal strength from the historical access request information; obtaining current reference signal strength, which indicates the strength of currently received reference signals; and selecting a RoT level based on the current reference signal strength and the historical reference signal strength. Further details will be found in descriptions in connection with FIG. 7.

According to some embodiments, the historical access request information comprises UE's historical transmit power associated with a historical random access request, in addition to the historical reference signal strength associated with the historical random access request. The RoT level may be selected by extracting the historical reference signal strength and the UE's historical transmit power from the historical access request information; obtaining current reference signal strength, which indicates the strength of currently received reference signals; and selecting a RoT level based on the current reference signal strength, the historical reference signal strength and the UE's historical transmit power. Further details will be found in descriptions in connection with FIG. 8.

With respect to embodiments illustrated by FIG. 6, it is advantageous that, the historical access request information is taken into account to select the RoT level suitable for initiating a random access request. In this way, the random access performance may be effectively improved.

Figure 7:
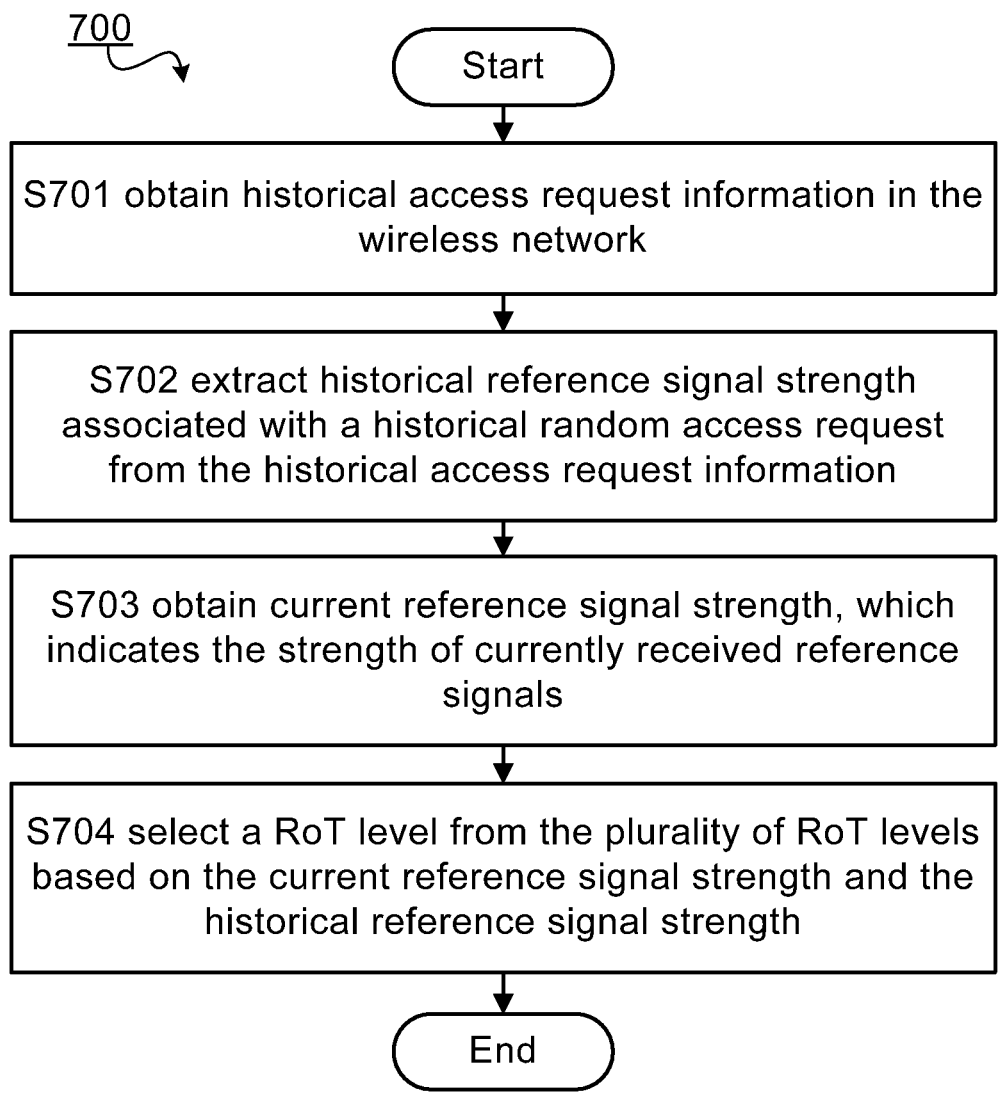
FIG. 7 illustrates a flow chart of a method 700 for selecting a RoT level from a plurality of RoT levels based on historical access request information according to embodiments of the invention.

Reference is now made to FIG. 7, which illustrates a flow chart of a method 700 for selecting a RoT level from a plurality of RoT levels based on historical access request information according to embodiments of the invention. Method 700 may be considered as an embodiment of step S101 of method 100 described above with reference to FIG. 1. Method 700 may be also considered as an embodiment of method 600 described above with reference to FIG. 6. However, it is noted that this is only for the purpose of illustrating the principles of the present invention, rather than limiting the scope thereof.

After method 700 starts, at step S701, historical access request information in the wireless network is obtained.

Step S701 in method 700 may be considered as an implementation of step S601 in method 600 as described above. Similar with step S601, the historical access request information in the wireless network is also obtained at S701.

At step S702, historical reference signal strength associated with a historical random access request is extracted from the historical access request information.

As discussed above, the historical access request information may comprise information on one or more random access requests. Thus, historical reference signal strength associated with a historical random access request may be extracted, wherein the historical random access request may be either a successful or a failed random access request.

At step S703, current reference signal strength, which indicates the strength of currently received reference signals, is obtained.

The reference signal strength may be obtained in several ways. For example, a UE may measure reference signals received from a wireless network node (such as a BS) to obtain the current strength of the reference signals. For another example, the BS may instruct a UE to perform measurement on the reference signals and report the measurement. In this way, the BS may obtain the current reference signal strength reported by UE. In embodiments of the present invention, the current reference signal strength is denoted as $S_{measured}$.

At step S704, a RoT level is selected from the plurality of RoT levels based on the current reference signal strength and the historical reference signal strength.

According to some embodiments of the present invention, the UE have made a successful random access request in one TTI (HARQ process). The UE may avoid to initiate a random access request in a time period whose RoT level is the same as the RoT level of the TTI (e.g., avoid to initiate a random access request in the TTI), if the following condition is met:

$$S_{measured} < k1 * S_{successful} \quad (1)$$

where:
$S_{measured}$ is the currently current reference signal strength;
$S_{successful}$ is the historical reference signal strength associated with the successful historical random access request; and
K1 is a configurable regulation parameter, which may be. e.g., set as being less than or equal to 1.

In an embodiment, when k1 is set as 1, the above policy for selecting a RoT level may comprise that: if the current reference signal strength is less than the historical reference signal strength, it is avoided to select the RoT level with which the historical random access request has been initiated.

According to further embodiments of the present invention, in the HARQ process, the UE has made a failed random access request in one TTI. The corresponding measured/estimated reference signal strength is denoted as $S_{failed}$. Then next time, the UE may avoid to initiate a random access request in a time period whose RoT level is the same as the RoT level of the TTI in which the failed historical random access request was initiated (e.g., avoid to initiate a random access request in the TTI), if the following condition is met:

$$S_{measured} < k2 * S_{failed} \quad (2)$$

where:
$S_{measured}$ is the currently current reference signal strength;
$S_{failed}$ is the historical reference signal strength associated with the failed historical random access request; and k2 is a configurable regulation parameter, which may preferably be. e.g., set as being larger than 1.

If the UE has made a failed random access request with reference signal strength $S_{failed}$, the random access request is very likely failed again if the reference signal strength is less than $k2 * S_{failed}$. Accordingly, the UE will not start the random access request if it judges that the random access request is very likely failed again according to the status of the random access request it has made in the past.

According to still further embodiments of the present invention, if UE has made multiple random access requests in TTIs (HARQ processes) with a certain RoT, multiple $S_{successful}$ and/or $S_{failed}$ may be extracted from the historical access request information. The judgment can be made optionally based on a combination of these multiple thresholds. For instance, if the UE has made two random access requests in one TTI (HARQ process) and both of the requests were successful, then next time the UE may avoid to initiate a random access request in a time period whose RoT level is the same as the RoT level of the TTI (e.g., avoid to start a random access request in the TTI), if the following condition is met:

$$S_{measured} < k3 * f(S_{successful1}, S_{successful2}) \quad (3)$$

Where:
$S_{measured}$ is the currently current reference signal strength;
$S_{successful1}$ and $S_{successful2}$ are the historical reference signal strengths associated with the two successful historical random access requests, respectively;
k3 is a configurable regulation parameter, which may be. e.g., set as being less than or equal to 1; and
f is a combination rule, which may for example be "max", "min", "mean", etc.

In an embodiment, when k3 is set as 1, the above policy for selecting a RoT level may comprise that: if the current reference signal strength is less than the maximum, the minimum or the mean value of the two successful historical reference signal strengths, it is avoided to select the RoT level of the TTI in which the two successful historical random access request were initiated.

According to yet still further embodiments of the present invention, if the UE has made two random access requests in one TTI (HARQ process), wherein one was successful and the other is failed, then next time the UE may avoid to initiate a random access request in a time period whose RoT level is the same as the RoT level of the TTI (e.g, avoid to start a random access request in the TTI), if the following condition is met:

$$S_{measured} < g(k1 * S_{successful}, k2 * S_{failed}) \quad (4)$$

where:
$S_{measured}$ is the currently current reference signal strength;
$S_{successful}$ is the historical reference signal strengths associated with the successful one of the historical random access requests;
$S_{failed}$ is the historical reference signal strengths associated with the failed one of the historical random access requests; and
g is a combination rule, which may for example be "max", "min", "mean", etc.

Furthermore, according to embodiments of the present invention, if both random access requests were failed, the UE may judge whether to initiate the random access request according to formula (2) based on the most recently recorded $S_{failed}$.

The above discussed policy may be easily extended to the case where the UE has made more than two random access requests in one TTI (HARQ process). It is to be note that, the above description is illustrated for purpose of example, rather than limitation.

Figure 8:
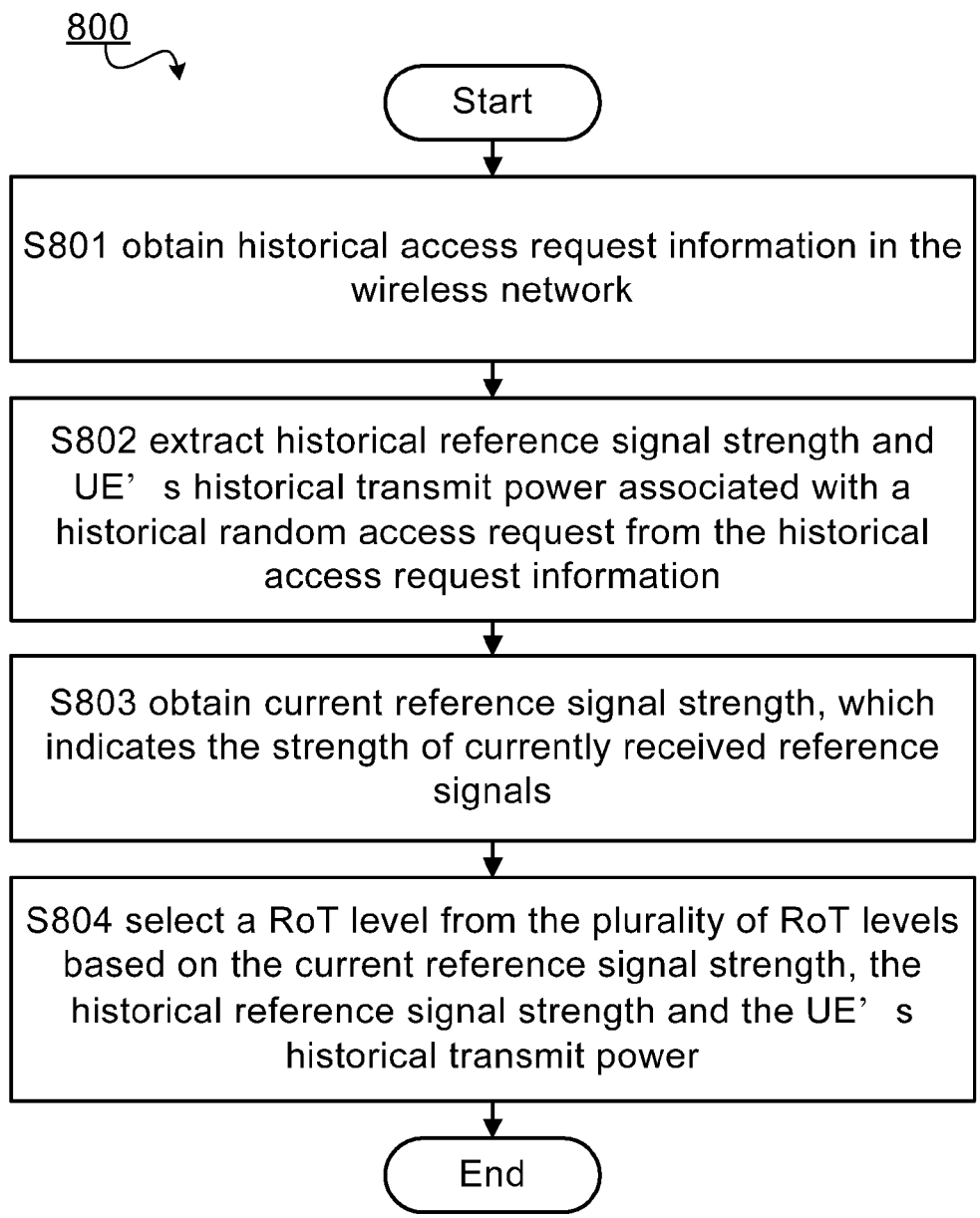
FIG. 8 illustrates a flow chart of a method 800 for selecting a RoT level from a plurality of RoT levels based on historical access request information according to embodiments of the invention.

Reference is now made to FIG. 8, which illustrates a flow chart of a method 800 for selecting a RoT level from a plurality of RoT levels based on historical access request information according to embodiments of the invention. Method 800 may be considered as an embodiment of step S101 of method 100 described above with reference to FIG. 1. Method 800 may be also considered as an embodiment of method 600 described above with reference to FIG. 6. It is noted that this is only for the purpose of illustrating the principles of the present invention, rather than limiting the scope thereof.

After method 800 starts, at step S801, historical access request information in the wireless network is obtained.

Step S801 in method 800 may be considered as an implementation of step S601 in method 600 as described above. Similar with step S601, the historical access request information in the wireless network is also obtained at S801.

At step S802, historical reference signal strength and UE's historical transmit power associated with a historical random access request are extracted from the historical access request information.

As discussed above, the historical access request information may comprise information on one or more random access requests. Thus, historical reference signal strength associated with a historical random access request may be extracted, wherein the historical random access request may be either a successful or a failed random access request. In addition, the UE's historical transmit power associated with a historical random access request may also be extracted, wherein the historical random access request may be a successful random access request.

At step S803, current reference signal strength, which indicates the strength of currently received reference signals, is obtained.

Step S803 in method 800 may be considered as an implementation of step S703 in method 700 as described above. Similar with step S703, the current reference signal strength may be obtained by either the wireless network node or the UE at S803.

At step S804, a RoT level is selected from the plurality of RoT levels based on the current reference signal strength, the historical reference signal strength and the UE's historical transmit power.

According to some embodiments of the present invention, the UE have made a successful random access request in one TTI (HARQ process). Then, the UE may avoid to initiate a random access request in a time period whose RoT level is the same as the RoT level of the TTI (e.g., avoid to initiate a random access request in the TTI), if the following condition is met:

$$S_{measured} < k4 * S_{successful} * P_{tx\_successful}/P_{max}, \quad (5)$$

where:
$S_{measured}$ is the currently current reference signal strength;
$S_{successful}$ is the historical reference signal strength associated with the successful historical random access request;
$P_{tx\_successful}$ is the UE's historical transmit power associated with the successful historical random access request;
$P_{max}$ is the maximum UE transmit power (Tx power); and
k4 is a configurable regulation parameter, which may be. e.g., set as being less than or equal to 1.

As such, UE will not start the random access request in a TTI if it judges that the random access request is very likely failed even transmitting with the maximum Tx power.

According to further embodiments of the present invention, if the UE has made two random access requests in one TTI (HARQ process) and both of the requests were successful, then next time the UE may avoid to initiate a random access request in a time period whose RoT level is the same as the RoT level of the TTI (e.g, avoid to start a random access request in the TTI), if the following condition is met:

$$S_{measured} < k5 * f(S_{successful1} * P_{tx\_successful1}/P_{max}, S_{successful2} * P_{tx\_successful2}/P_{max}) \quad (6)$$

where:
$S_{measured}$ is the currently current reference signal strength;
$S_{successful1}$ and $S_{successful2}$ are the historical reference signal strengths associated with the two successful historical random access requests, respectively;
$P_{tx\_successful1}$ and $P_{tx\_successful2}$ are UE's historical transmit powers associated with the two successful historical random access requests, respectively;
$P_{max}$ is the maximum UE transmit power (Tx power);
k5 is a configurable regulation parameter, which may be. e.g., set as being less than or equal to 1; and
f is a combination rule, which may for example be "max", "min", "mean", etc.

According to still further embodiments of the present invention, if the UE has made two random access requests in one TTI (HARQ process), wherein one was successful and the other is failed, then next time the UE may avoid to initiate a random access request in a time period whose RoT level is the same as the RoT level of the TTI (e.g, avoid to start a random access request in the TTI), if the following condition is met:

$$S_{measured} < g(k4 * S_{successful} * P_{tx\_successful}/P_{max}, k2 * S_{failed}) \quad (7)$$

where:
$S_{measured}$ is the currently current reference signal strength;
$S_{successful}$ is the historical reference signal strengths associated with the successful one of the historical random access requests;
$S_{failed}$ is the historical reference signal strengths associated with the failed one of the historical random access requests;
$P_{tx\_successful}$ is the UE's historical transmit power associated with the successful historical random access request;
$P_{max}$ is the maximum UE transmit power (Tx power); and
g is a combination rule, which may for example be "max", "min", "mean", etc.

The above discussed policy may be easily extended to the case where the UE has made more than two random access requests in one TTI (HARQ process). It is to be noted that, the above description is illustrated for purpose of example, rather than limitation.

Figure 9:
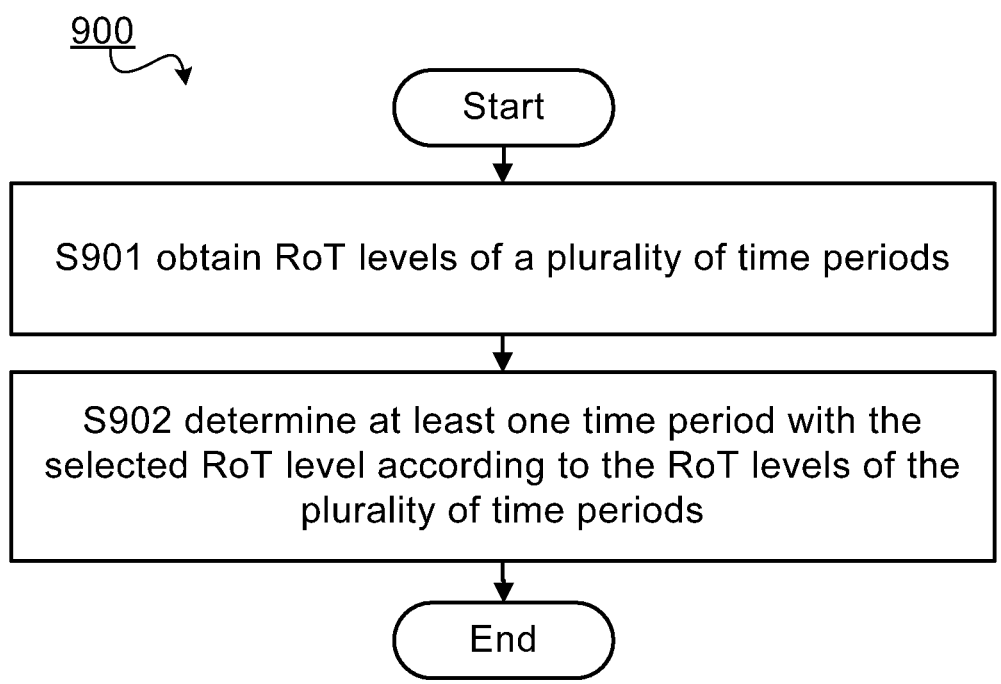
FIG. 9 illustrates a flow chart of a method 900 for determining a time period with the selected RoT level for initiating a random access request according to embodiments of the invention.

Reference is now made to FIG. 9, which illustrates a flow chart of a method 900 for determining a time period with the selected RoT level for initiating a random access request according to embodiments of the invention. Method 900 may be considered as an embodiment of step S102 of method 100 described above with reference to FIG. 1. It is noted that this is only for the purpose of illustrating the principles of the present invention, rather than limiting the scope thereof.

After method 900 starts, at step S901, RoT levels of a plurality of time periods are obtained.

In accordance with embodiments of the present invention, a time period may comprise one or more TTIs (HARQ processes). A time period may have a corresponding RoT level, which indicates the target RoT in the time period. The RoT levels of respective time periods may be learned by both the wireless network node and the UE. In an embodiment, eight RoT levels different from each other may be respectively assigned to the 8 TTIs (HARQ processes). In another embodiment, the 8 TTIs (HARQ processes) may have three RoT levels, i.e., low, medium and high levels.

It is to be noted that the RoT levels may be designed according to experience of those skilled in the art and/or concrete conditions in the wireless network. The above examples of the RoT levels are only for illustration, rather than limitation.

At step S902, at least one time period with the selected RoT level is determined according to the RoT levels of the plurality of time periods.

Figure 15:
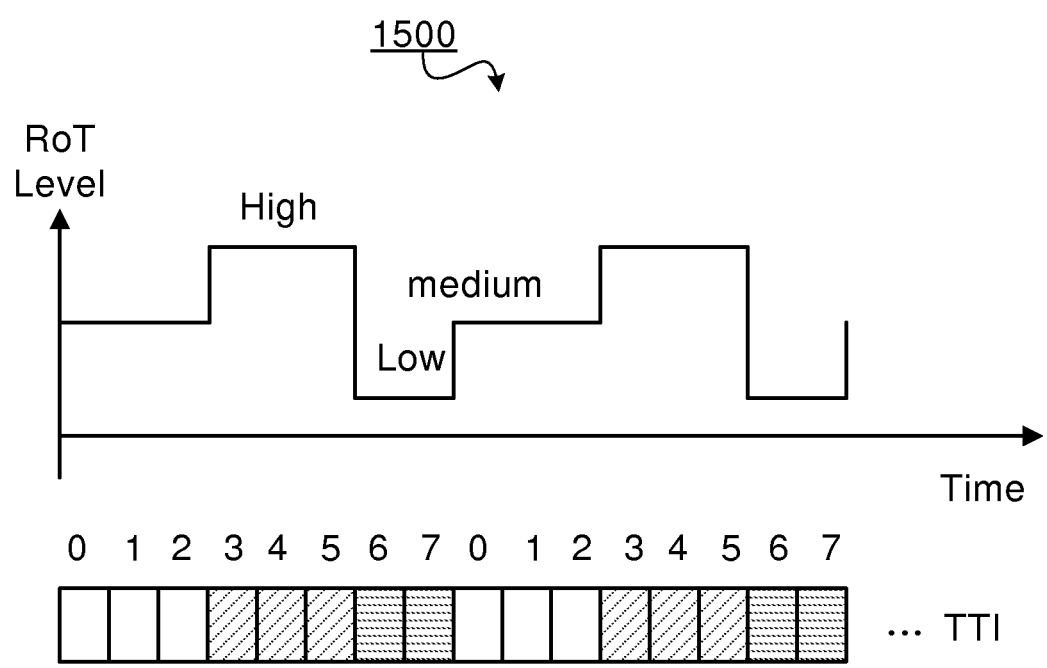
FIG. 15 illustrates a schematic diagram 1500 of time periods with respective RoT levels according to embodiments of the invention.

As discussed above, one or more time periods, e.g., TTIs, may have the same RoT level. For example, when there are 8 TTIs and three RoT levels, i.e., low, medium and high levels, TTIs 0-2 may have the medium RoT level, TTIs 3-5 may have the high RoT level and TTIs 6-7 may have the low RoT level. FIG. 15 illustrates a schematic diagram 1500 of time periods with respective RoT levels according to the above embodiments.

Based on the RoT level selected according to embodiments of the present invention, such as embodiments in connection with methods 200-800, one or more time periods may be determined for initiating the random access request. For example, if a high RoT level is selected, any one of TTIs 3-5 which has the high RoT level may be determined for initiating the random access request.

Figure 10:
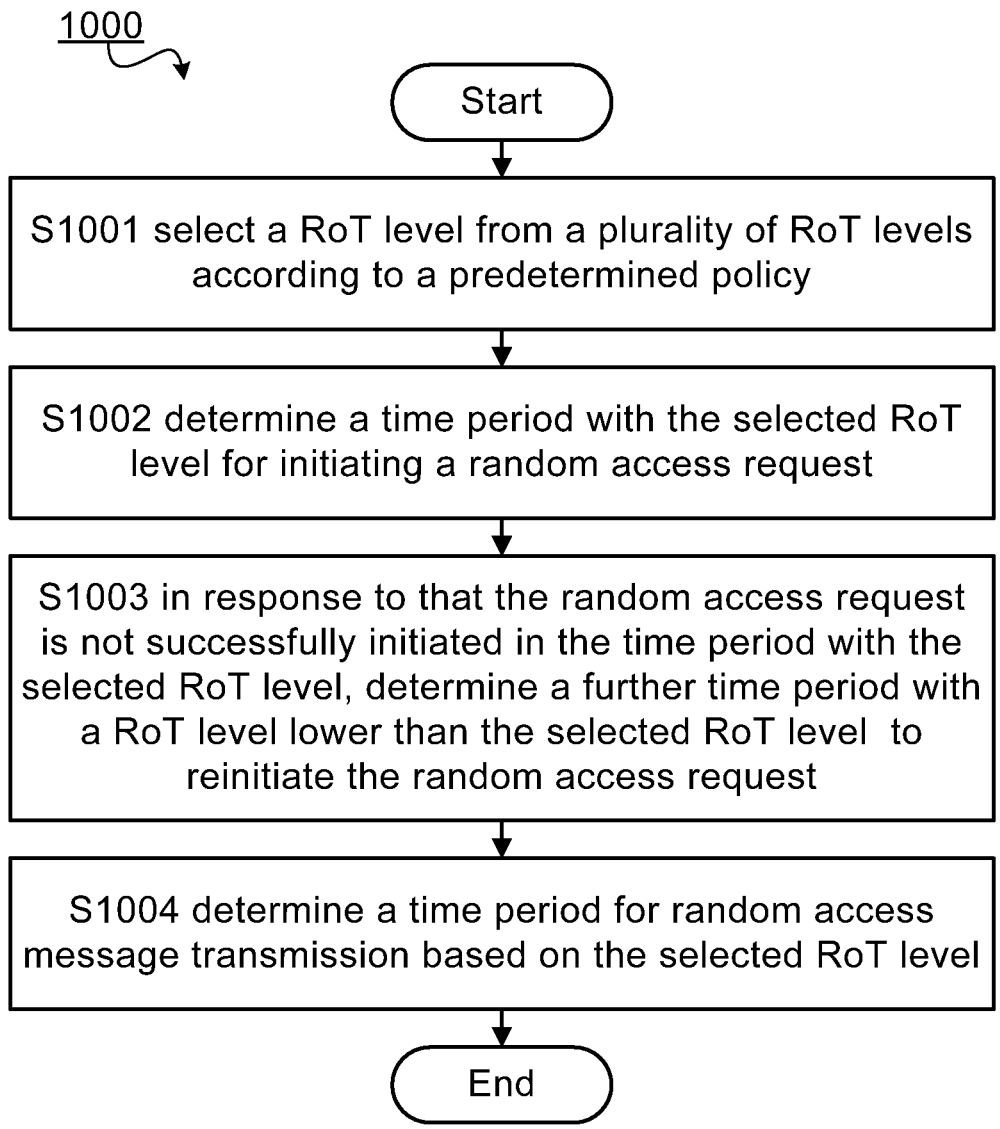
FIG. 10 illustrates a flow chart of a method 1000 for random access in a wireless network according to embodiments of the invention.

Reference is now made to FIG. 10, which illustrates a flow chart of a method 1000 for random access in a wireless network according to embodiments of the invention. Method 1000 may be considered as an embodiment of method 100 described above with reference to FIG. 1. It is noted that this is only for the purpose of illustrating the principles of the present invention, rather than limiting the scope thereof.

After method 1000 starts, at step S1001, a RoT level is selected from a plurality of RoT levels according to a predetermined policy.

Step S1001 in method 1000 may be considered as an implementation of step S101 in method 100 as described above. Similar with step S101, a RoT level is also selected according to a predetermined policy at step S1001. Further details may be found in descriptions in connection with methods 200-800.

At step S1002, a time period with the selected RoT level is determined for initiating a random access request.

Step S1002 in method 1000 may be considered as an implementation of step S102 in method 100 as described above. Similar with step S102, a time period with the selected RoT level is also determined at step S1002. Further details may be found in descriptions in connection with method 900.

At step S1003, in response to that the random access request is not successfully initiated in the time period with the selected RoT level, e.g., due to too low SINR level, a further time period with a RoT level lower than the selected RoT level is determined to reinitiate the random access request.

According to embodiments of the present invention, when there are TTIs with medium and/or high RoT levels are allowed for random access requests, some random access requests may be missed even after the maximum number of preamble retransmissions due to too low SINR. In this case, it is very likely that those requests are missed again if they are still transmitted in TTIs with medium or high RoT level. Thus, it would be better to have them re-sent in TTIs with lower RoT level.

According to existing solutions, UEs will randomly re-select a TTI allowed for access regardless of its RoT level to re-send the random access request. It is likely that still a TTI with medium or high RoT level is selected and the random access fails again. This will trigger another resending of the random access requests, which both increases uplink load consumption and random access delay.

With respect to embodiments illustrated by FIG. 10, it is advantageous that, different from existing solutions, embodiments of the present invention have these failed random access requests resent in TTIs with low RoT level. This may be implemented by only allowing random access to be in TTIs with a lower RoT level for UEs that have reached the maximum number of random access retransmissions but still not receiving the acknowledgement. This policy may be predefined and informed to UEs using e.g. a broadcast message. The UEs may then reinitialize another random access in the available TTIs with a lower RoT level after a certain timer is expired.

At step S1004, a time period for random access message transmission is determined based on the selected RoT level.

In accordance with embodiments of the present invention, in response to that a random access request is successfully initiated, a time period with the selected RoT level may be determined for random access message transmission. For example, if a random access request is successfully initiated in the TTI with high RoT level, then TTI(s) with the high RoT level may be determined to be used for random access message transmission. Likewise, if a random access request is successfully initiated in the TTI with low/medium RoT level, then TTI(s) with the low/medium RoT level may be determined to be used for random access message transmission.

In accordance with embodiments of the present invention, in response to that a random access request is successfully initiated, a time period with a RoT level lower than or equal to the selected RoT level may be determined for random access message transmission.

For example, all TTIs (HARQ processes) may be allowed for the random access message transmission if the random access is succeeded in TTI(s) (HARQ processes) with high RoT level. TTI(s) (HARQ processes) with medium and low RoT level may be allowed for the random access message transmission if the random access is succeeded in TTI(s) (HARQ processes) with medium RoT level. Only TTIs (HARQ processes) with low RoT level may be allowed for the random message transmission if the random access is succeeded in TTI(s) (HARQ processes) with low (target) RoT.

In this way, the RACH traffic load (from the message transmission) may be evenly distributed while the performance of random message transmission can also be ensured but not excessively protected.

For the purpose of illustrating spirit and principle of the present invention, some specific embodiments thereof have been described above. It will be appreciated by a person skilled in the art that embodiments of the present invention may be varied or modified without departing from the scope of the present invention.

Figure 11:
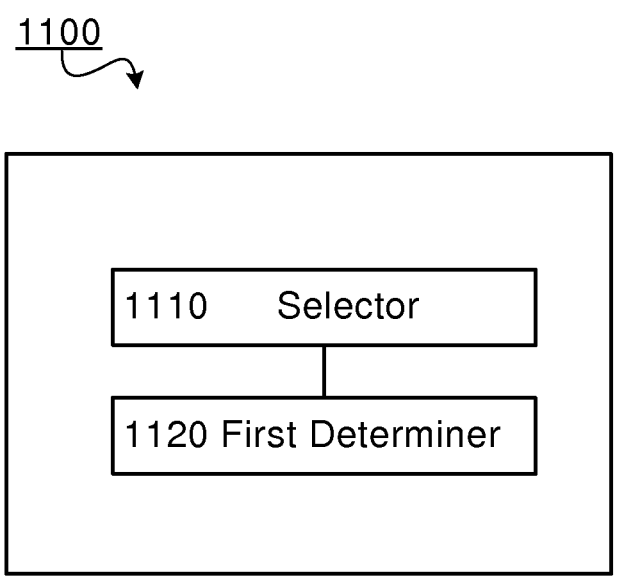
FIG. 11 illustrates a block diagram of an apparatus 1100 random access in a wireless network according to embodiments of the invention.

Reference is now made to FIG. 11, which illustrates a block diagram of an apparatus 1100 for random access in a wireless network according to embodiments of the invention. As shown, the apparatus 1100 comprises: a selector 1110 configured to select a RoT level from a plurality of RoT levels according to a predetermined policy; and a first determiner 1120 configured to determine a time period with the selected RoT level for initiating a random access request.

In accordance with embodiments of the present invention, the apparatus 1100 may be implemented in a wireless network node, a UE, or any other applicable device.

In accordance with embodiments of the present invention, the selector 1110 may be further configured to select a RoT level from the plurality of RoT levels according to at least one of: random access request load, signal quality, and historical access request information.

Figure 12:
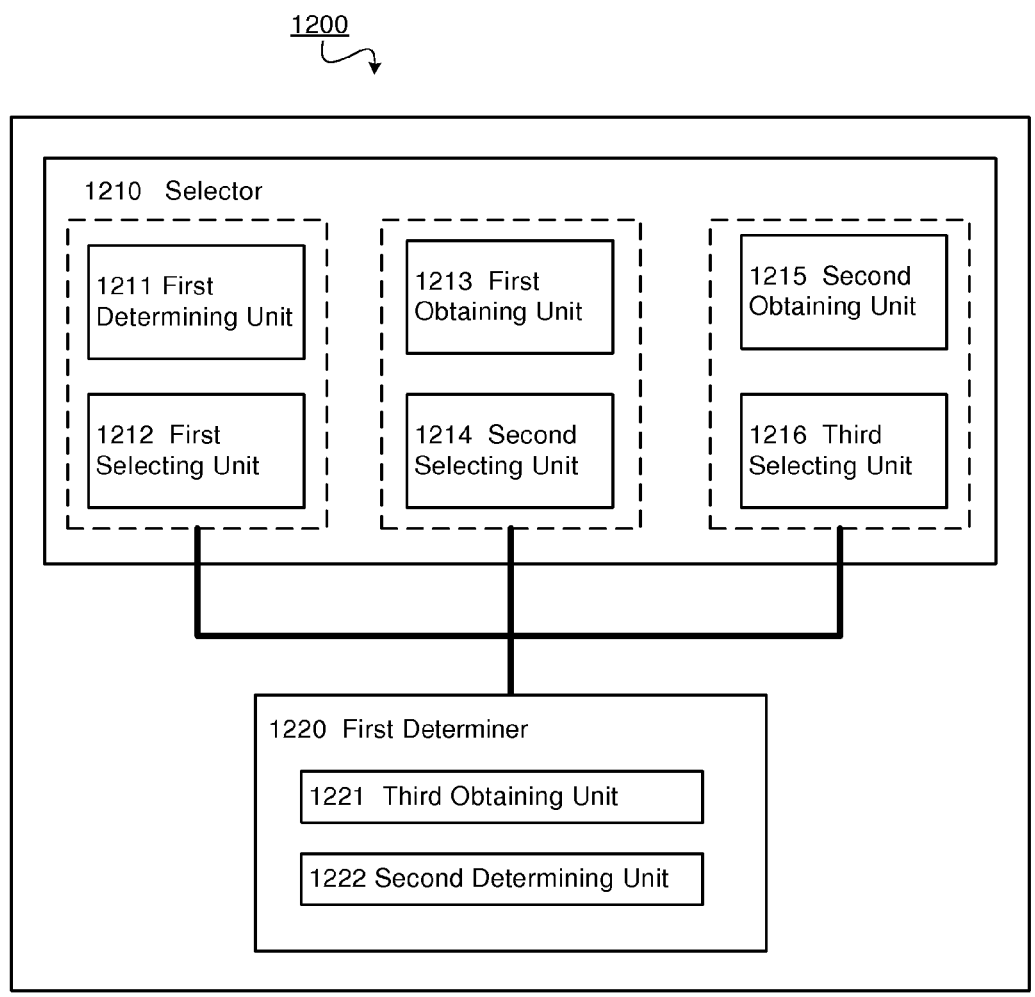
FIG. 12 illustrates a block diagram of an apparatus 1200 random access in a wireless network according to embodiments of the invention.

Reference is now made to FIG. 12, which illustrates a block diagram of an apparatus 1200 for random access in a wireless network according to embodiments of the invention. As shown, the apparatus 1200 comprises: a selector 1210 configured to select a RoT level from a plurality of RoT levels according to a predetermined policy; and a first determiner 1120 configured to determine a time period with the selected RoT level for initiating a random access request. The apparatus 1200 may be considered as an embodiment of the apparatus 1100 described above with reference to FIG. 11.

In accordance with embodiments of the present invention, the selector 1210 may comprise: a first determining unit 1211 configured to determine random access request load in at least one time period; and a first selecting unit 1212 configured to select a RoT level from the plurality of RoT levels based on the random access request load.

According to some embodiments of the present invention, the first determining unit 1211 may be further configured to: obtain a number of collided random access requests in the at least one time period; obtain a total number of random access requests in the at least one time period; and determine random access request load based on the number of collided random access requests and the total number of random access requests.

According to some embodiments of the present invention, the first selecting unit 1212 may be further configured to: obtain a plurality of random access request load levels; determine a random access request load level for the random access request load according to the plurality of random access request load levels; and select at least one RoT level from a plurality of RoT levels according to the determined random access request load level.

In accordance with embodiments of the present invention, the selector 1210 may comprise: a first obtaining unit 1213 configured to obtain signal quality of a channel between a Radio Network Node and a UE; and a second selecting unit 1214 configured to select a RoT level from the plurality of RoT levels based on the signal quality.

According to some embodiments of the present invention, the second selecting unit 1214 may be further configured to: obtain a plurality of quality levels; determine a quality level for the signal quality according to the plurality of quality levels; and select at least one RoT level from a plurality of RoT levels according to the determined quality level.

In accordance with embodiments of the present invention, the selector 1210 may comprise: a second obtaining unit 1215 configured to obtain historical access request information in the wireless network; and a third selecting unit 1216 configured to select a RoT level from the plurality of RoT levels based on the historical access request information.

According to some embodiments of the present invention, the historical access request information may comprise historical reference signal strength and/or UE's historical transmit power associated with a historical random access request.

According to some embodiments of the present invention, the third selecting unit 1216 may be further configured to: extract historical reference signal strength associated with a historical random access request from the historical access request information, wherein the historical reference signal strength indicates strength of reference signals obtained during initiation of the historical random access request; obtain current reference signal strength, which indicates the strength of currently received reference signals; and select a RoT level from the plurality of RoT levels based on the current reference signal strength and the historical reference signal strength.

According to some embodiments of the present invention, the third selecting unit 1216 may be further configured to: extract historical reference signal strength and UE's historical transmit power associated with a historical random access request from the historical access request information, wherein the historical reference signal strength indicates strength of reference signals obtained during initiation of the historical random access request; obtain current reference signal strength, which indicates the strength of currently received reference signals; and select a RoT level from the plurality of RoT levels based on the current reference signal strength, the historical reference signal strength and the UE's historical transmit power.

In accordance with embodiments of the present invention, the selector 1210 may comprise: a third obtaining unit 1221 configured to obtain RoT levels of a plurality of time periods; and a second determining unit 1222 configured to determine at least one time period with the selected RoT level according to the RoT levels of the plurality of time periods.

Figure 13:
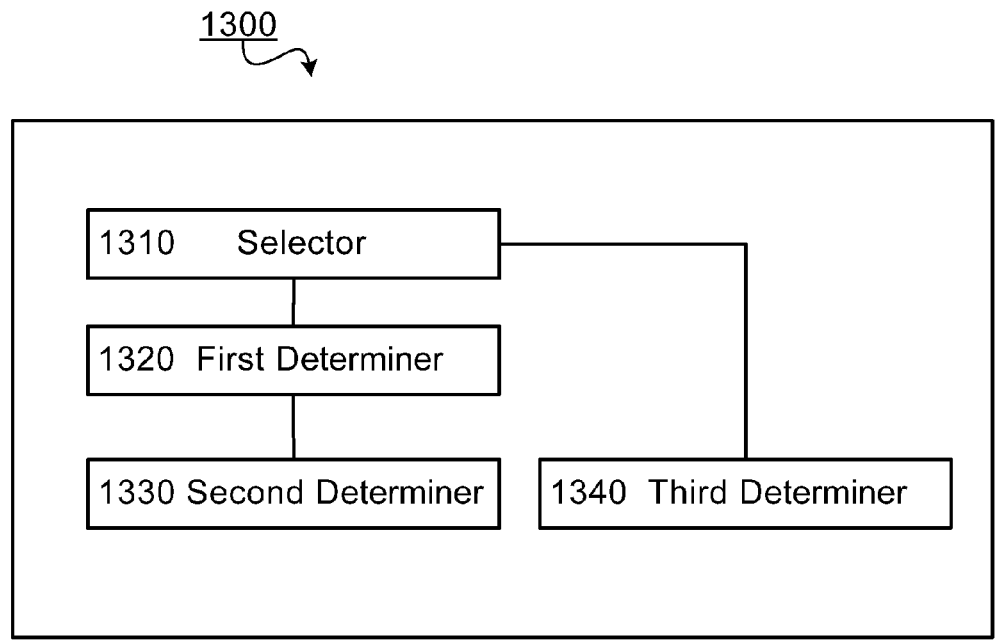
FIG. 13 illustrates a block diagram of an apparatus 1300 random access in a wireless network according to embodiments of the invention.

Reference is now made to FIG. 13, which illustrates a block diagram of an apparatus 1300 for random access in a wireless network according to embodiments of the invention. As shown, the apparatus 1300 comprises: a selector 1310 configured to select a RoT level from a plurality of RoT levels according to a predetermined policy; a first determiner 1320 configured to determine a time period with the selected RoT level for initiating a random access request; a second determiner 1330 configured to, in response to that the random access request is not successfully initiated in the time period with the selected RoT level, determine a further time period with a RoT level lower than the selected RoT level to reinitiate the random access request; and a third determiner 1340 configured to determine a time period for random access message transmission based on the selected RoT level. In accordance with embodiments of the present invention, the apparatus 1300 may be implemented in a wireless network node, a UE, or any other applicable device. The apparatus 1300 may be considered as another embodiment of the apparatus 1100 described above with reference to FIG. 11.

In accordance with embodiments of the present invention, the third determiner 1340 may be configured to: in response to that a random access request is successfully initiated, determine a time period with the selected RoT level for random access message transmission. In other words, if a random access request is successfully initiated with a selected RoT level, the third determiner 1340 may determine a time period with the selected RoT level for random access message transmission.

In accordance with embodiments of the present invention, the third determiner 1340 may be configured to: in response to that a random access request is successfully initiated, determine a time period with a RoT level lower than or equal to the selected RoT level. In other words, if a random access request is successfully initiated with a selected RoT level, the third determiner 1340 may determine a time period with a RoT level lower than or equal to the selected RoT level for random access message transmission.

It is to be noted that the apparatus 1100, 1200 or 1300 may be implemented in a wireless network node (such as, a RNC, a BS, a BSC, a gateway, a relay, a server, etc.) or a user equipment (such as a mobile terminal, a mobile station, etc.), or any other applicable device. The apparatus 1100, 1200 or 1300 may be applied in several communication networks, such as a CDMA network. It is also to be noted that the selector, the first determiner, the second determiner and the third determiner may be implemented by any suitable technique either known at present or developed in the future. Further, a single device shown in FIG. 11, FIG. 12 or FIG. 13 may be alternatively implemented in multiple devices separately, and multiple separated devices may be implemented in a single device. The scope of the present invention is not limited in these regards.

It is noted that, in some embodiment of the present disclosure, the apparatus 1100, 1200 or 1300 may be configured to implement functionalities as described with reference to FIGS. 1-9. Therefore, the features discussed with respect to any of methods 100 to 900 may apply to the corresponding components of the apparatus 1100, 1200 or 1300. It is further noted that the components of the apparatus 1100, 1200 or 1300 may be embodied in hardware, software, firmware, and/or any combination thereof. For example, the components of the apparatus 1100, 1200 or 1300 may be respectively implemented by a circuit, a processor or any other appropriate selection device. Those skilled in the art will appreciate that the aforesaid examples are only for illustration not limitation.

Figure 14:
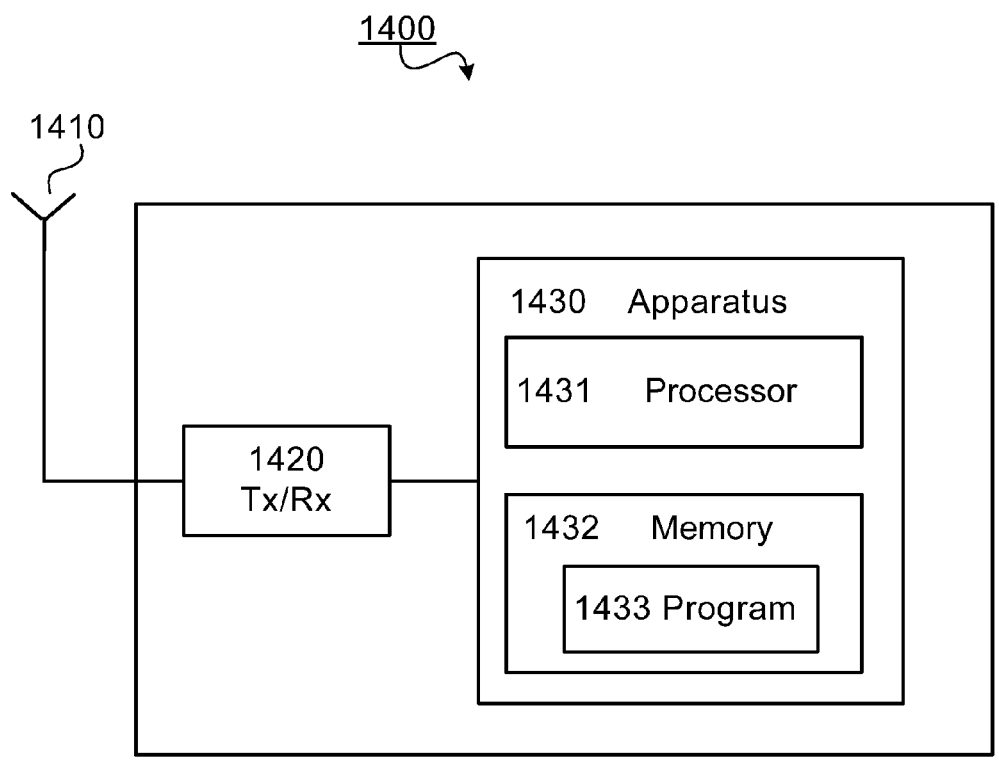
FIG. 14 illustrates a block diagram of a device 1400 that is suitable for implementing the exemplary embodiments of the invention.

Reference is now made to FIG. 14, which illustrates a block diagram of a device 1400 that is suitable for implementing the exemplary embodiments of the invention. The device 1400 may comprise an antenna 1410, a transmitter (TX)/receiver (RX) 1420 coupled to the antenna 1410, and an apparatus 1430 coupled to the TX/RX 1420. Through the antenna 1410, the device 1400 may communicate with external communication devices or access external networks or systems. The TX/RX 1420 is for bidirectional wireless communications with external communication devices. The apparatus 1430 may comprise at least one processor 1431; and at least one memory 1432 including compute program instructions 1433, wherein the at least one memory 1432 and computer program instructions 1433 are configured to, with the at least one processor 1431, cause the apparatus 1430 at least to perform methods according to embodiments of the present invention.

The at least one processor is suitable for use with embodiments of the present disclosure and may include, by way of example, both general and special purpose processors already known or developed in the future. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus to at least perform according to any of methods 100 to 900 as discussed above. It is to be noted that although FIG. 14 shows that the apparatus 1430 is included in the device 1400 (such as a wireless network node, a UE, etc.), the apparatus 1430 may be associated with the device 1400 (for example, interfaces with the device 1400), instead of being a part of the device 1400.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 1 to 9 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit, FPGA or ASIC that is configurable to operate in accordance with the exemplary embodiments of the present invention.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various modifications, adaptations to the foregoing exemplary embodiments of this invention may become apparent to those skilled in the relevant arts in view of the foregoing description, when read in conjunction with the accompanying drawings. Any and all modifications will still fall within the scope of the non-limiting and exemplary embodiments of this invention. Furthermore, other embodiments of the inventions set forth herein will come to mind to one skilled in the art to which these embodiments of the invention pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for random access in a wireless network, comprising:
   selecting a rise over thermal (RoT) level from a plurality of RoT levels according to a predetermined policy; and
   determining a time period with the selected RoT level for initiating a random access request;
   wherein selecting a RoT level from a plurality of RoT levels based on a predetermined policy comprises:
   determining random access request load in at least one time period; and
   selecting a RoT level from the plurality of RoT levels based on the random access request load.

2. The method of claim 1, wherein selecting a RoT level from a plurality of RoT levels according to a predetermined policy comprises selecting a RoT level from the plurality of RoT levels according to at least one of: random access request load, signal quality, and historical access request information.

3. The method of claim 1, wherein determining random access request load in at least one time period comprises:
   obtaining a number of collided random access requests in the at least one time period;
   obtaining a total number of random access requests in the at least one time period; and
   determining random access request load based on the number of collided random access requests and the total number of random access requests.

4. The method of claim 1, wherein selecting a RoT level from the plurality of RoT levels based on the random access request load comprises:
   obtaining a plurality of random access request load levels;
   determining a random access request load level for the random access request load according to the plurality of random access request load levels; and
   selecting at least one RoT level from a plurality of RoT levels according to the determined random access request load level.

5. The method of claim 1, wherein selecting a RoT level from a plurality of RoT levels based on a predetermined policy comprises:
   obtaining signal quality of a channel between a wireless network node and a user equipment (UE); and
   selecting a RoT level from the plurality of RoT levels based on the signal quality.

6. The method of claim 5, wherein selecting a RoT level from the plurality of RoT levels based on the signal quality comprises:
   obtaining a plurality of quality levels;
   determining a quality level for the signal quality according to the plurality of quality levels; and
   selecting at least one RoT level from a plurality of RoT levels according to the determined quality level.

7. The method of claim 1, wherein selecting a RoT level from a plurality of RoT levels based on a predetermined policy comprises:
   obtaining historical access request information in the wireless network; and
   selecting a RoT level from the plurality of RoT levels based on the historical access request information.

8. The method of claim 7, wherein the historical access request information comprises historical reference signal strength and/or UE's historical transmit power associated with a historical random access request.

9. The method of claim 8, wherein selecting a RoT level from the plurality of RoT levels based on the historical access request information comprises:
   extracting historical reference signal strength associated with a historical random access request from the historical access request information, wherein the historical reference signal strength indicates strength of reference signals obtained during initiation of the historical random access request;
   obtaining current reference signal strength, which indicates the strength of currently received reference signals; and
   selecting a RoT level from the plurality of RoT levels based on the current reference signal strength and the historical reference signal strength.

10. The method of claim 8, wherein selecting a RoT level from the plurality of RoT levels based on the historical access request information comprises:
    extracting historical reference signal strength and UE's historical transmit power associated with a historical random access request from the historical access request information, wherein the historical reference signal strength indicates strength of reference signals obtained during initiation of the historical random access request;
    obtaining current reference signal strength, which indicates the strength of currently received reference signals; and
    selecting a RoT level from the plurality of RoT levels based on the current reference signal strength, the historical reference signal strength and the UE's historical transmit power.

11. The method of claim 1, wherein determining a time period with the selected RoT level for initiating a random access request comprises:
    obtaining RoT levels of a plurality of time periods; and
    determining at least one time period with the selected RoT level according to the RoT levels of the plurality of time periods.

12. The method of claim 1, further comprising, in response to that the random access request is not successfully initiated in the time period with the selected RoT level, determining a further time period with a RoT level lower than the selected RoT level to reinitiate the random access request.

13. The method of claim 1, further comprising determining a time period for random access message transmission based on the selected RoT level.

14. The method of claim 13, wherein determining a time period for random access message transmission based on the selected RoT level comprises:
    in response to that a random access request is successfully initiated, determining a time period with the selected RoT level for random access message transmission.

15. The method of claim 14, wherein determining a time period for random access message transmission based on the selected RoT level comprises:
    in response to that a random access request is successfully initiated, determining a time period with a RoT level lower than or equal to the selected RoT level for random access message transmission.

16. The method of claim 1, wherein said method is performed by a wireless network node or a user equipment (UE).

17. The method of claim 1, wherein the wireless network is a code-division multiple-access (CDMA) network.

18. An apparatus for random access in a wireless network, comprising:
- at least one processor; and
- at least one memory including computer program instructions, wherein the at least one memory and computer program instructions are configured so that when the at least one processor executes the computer program instructions, the at least one processor is thereby configured to cause the apparatus to:
- select a rise over thermal (RoT) level from a plurality of RoT levels according to a predetermined policy; and
- determine a time period with the selected RoT level for initiating a random access request;

wherein the at least one memory and computer program instructions are further configured so that when the at least one processor executes the computer program instructions, the at least one processor is thereby configured to cause the apparatus to select the RoT level from a plurality of RoT levels by:
- determining random access request load in at least one time period; and
- selecting a RoT level from the plurality of RoT levels based on the random access request load.

19. A non-transitory computer-readable medium comprising, stored thereupon, program code instructions that, when executed by a processor in a node of a wireless network, cause the node to:
- select a rise over thermal (RoT) level from a plurality of RoT levels according to a predetermined policy; and
- determine a time period with the selected RoT level for initiating a random access request;

wherein the program instructions are configured to cause the node to select the RoT level from a plurality of RoT levels by:
- determining random access request load in at least one time period; and
- selecting a RoT level from the plurality of RoT levels based on the random access request load.

* * * * *